United States Patent
Tamburro (10) Patent No.: US 11,937,090 B1
(45) Date of Patent: Mar. 19, 2024

(54) PROVENANCE BASED RISK SCORING FOR MOBILE DEVICES

(71) Applicant: Morgan Stanley Services Group Inc., New York, NY (US)

(72) Inventor: Michael Tamburro, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/232,020

(22) Filed: Aug. 9, 2023

(51) Int. Cl.
*H04W 12/67* (2021.01)
*H04W 12/06* (2021.01)
*H04W 12/30* (2021.01)
*H04W 12/71* (2021.01)

(52) U.S. Cl.
CPC ........... *H04W 12/67* (2021.01); *H04W 12/06* (2013.01); *H04W 12/35* (2021.01); *H04W 12/71* (2021.01)

(58) Field of Classification Search
CPC ..... H04W 12/67; H04W 12/06; H04W 12/35; H04W 12/71
See application file for complete search history.

(56) References Cited

U.S. PATENT DOCUMENTS

| | | | |
|---|---|---|---|
| 11,218,317 B1 | 1/2022 | Miller | |
| 2006/0223504 A1* | 10/2006 | Ishak | H04W 52/0251 455/414.1 |
| 2007/0150559 A1* | 6/2007 | Smith | G06F 21/85 709/220 |
| 2012/0060214 A1 | 3/2012 | Nahari | |
| 2013/0169434 A1* | 7/2013 | McCown | H04M 11/04 340/5.2 |
| 2016/0099963 A1* | 4/2016 | Mahaffey | G06F 21/554 726/25 |
| 2018/0114000 A1 | 4/2018 | Taylor | |
| 2018/0343275 A1 | 11/2018 | Moon et al. | |
| 2018/0359244 A1* | 12/2018 | Cockerill | H04L 63/12 |
| 2019/0303586 A1* | 10/2019 | Mahaffey | H04L 63/1408 |

(Continued)

OTHER PUBLICATIONS

Guo et al., "Research on risk analysis and security testing technology of mobile application in power system", Nov. 2017, IEEE Conference on Energy Internet and Energy System Integration, pp. 1-6 (Year: 2017).*

*Primary Examiner* — Kenneth W Chang
(74) *Attorney, Agent, or Firm* — K&L Gates LLP (57) ABSTRACT

System comprises an application server for hosting a mobile application service; a mobile device having a mobile application for the mobile application service installed thereon; and a third party server. Application server is configured to: receive a log-in request for the mobile application service from the mobile device, where the log-in request includes device identifying information for the mobile device; transmit, to the third party server, a request for a status setting for the mobile application, wherein the request comprises the device identifying information for the mobile device, where the status setting comprises a plurality of bits, and where the third party server retrieves the status setting from a database based on the device identifying information for the mobile device; receive from the third party server, the status setting for the mobile application; and determine a risk rating for the log-in request based in part on the status setting for the mobile application.

30 Claims, 3 Drawing Sheets

(56) References Cited

U.S. PATENT DOCUMENTS

| | | |
|---|---|---|
| 2020/0233949 A1* | 7/2020 | Xia .................... H04W 12/08 |
| 2020/0287890 A1 | 9/2020 | Edgington |
| 2020/0351260 A1 | 11/2020 | White et al. |
| 2020/0396220 A1* | 12/2020 | McKegney ........... H04W 12/06 |
| 2021/0125194 A1 | 4/2021 | Holland, IV et al. |

* cited by examiner

PROVENANCE BASED RISK SCORING FOR MOBILE DEVICES

BACKGROUND

A mobile application or "app" is a computer program or software application designed to run on a mobile device, such as a smartphone, tablet, or wearable computer. Particularly where the mobile application is for financial transactions, it is important that the host of the mobile application authenticate the user of the mobile device. Mobile authentication is the verification of a user's identity via the mobile device using one or more authentication methods for secure access. Attestation, on the other hand, allows app developers to attest the authenticity of apps, devices, and requests made from those apps.

SUMMARY

In one general aspect, the present invention is directed to computer-based systems and methods to assign a risk score to a network request to an application server. The system can comprise the application server that hosts a mobile application service; a mobile device having a mobile application for the mobile application service installed thereon; and a third party server. The third party server could be, for example, a server for a producer of the operating system of the mobile device. When the application server receives a log-in request for the mobile application service from the mobile device, where the log-in request includes device identifying information for the mobile device, the application server can transmit, to the third party server, a request for a status setting for the mobile application. The request can comprise the device identifying information for the mobile device, and the status setting can comprises a plurality of bits. In particular, the status setting can comprise limited permanent device markings from the third party server for the mobile device. The third party server can retrieve the status setting from a database based on the device identifying information for the mobile device and the application server can receive from the third party server the status setting for the mobile application. Based in part on the status setting for the mobile application, the application service can determine a risk rating for the log-in request. The application server can use the risk rating, possibly in concert with other information, to grant or deny the log-in request, or to seek additional verification from the user of the mobile device. These and other benefits that are realizable from embodiments of the present invention will be apparent from the description that follows.

BRIEF DESCRIPTION OF THE FIGURES

Various embodiments of the present invention are described herein in conjunction with the following figures.

DETAILED DESCRIPTION

This disclosure makes use, in various embodiments, of limited permanent device markings to generate a historical record to help determine the authenticity of a mobile login attempt. In the name of privacy, mobile OS manufacturers stopped allowing app developers to persistently identify a mobile device (using a hardware identifier).

As a concession, certain mobile OS manufacturer's allow two bits of data (associated with a specific device) to be stored permanently. The systems and methods of the present invention, in various embodiments, use these bits to identify classes of good and bad devices, in conjunction with data collected at the time of login, to generate a risk score for the user session. For example, when the identity of a device is reset by an end user, there is no real way to recognize the device. The systems and methods of the present invention can make the most of the limited data that can be stored to classify trustworthiness of the mobile device.

Mobile OS manufacturers give app developers various ways to attest the authenticity of apps, devices, the requests made from those applications, and in the case of Apple, limited permanent marking of iOS devices. The systems and methods of the present invention can use these capabilities, in conjunction with data about login attempts, to assign a risk score to a network request to a server. The systems and methods of the present invention can use records of characteristics over time to come up with a novel risk score that can be evaluated in tandem with traditional risk scoring techniques (e.g., device fingerprint, telecom operator records, cryptographical keypair validation, etc.)

In one general embodiment, the systems/methods can use the assignment of meaning to the limited data that a mobile OS manufacturers allows app developers to use to permanently mark a specific mobile device. In one embodiment, the mobile OS manufacturers allow app developers to store two bits of data per device, effectively creating four states.

In one general aspect, the systems/methods uses the permanent markings and an assessment of the device's login attempts (for a current authentication session) to derive additional insights about the level of risk that should be assigned to the session, or whether defensive action should be taken against a series of failed attempts.

In general, the information about login attempts that can be collected by the application include: 1. The number of login attempts; 2. Whether the login attempts are successful; 3. The time between login attempts; 4 The username used for each login attempt; 5. The number of failed login attempts before a successful login attempt for a given username; 6. The number of different usernames used. In one aspect, this data are collected for a given "authentication session." which is defined by a series of attempts while an app is in an active state (bookended by an app being in an inactive or background state.)

Figure 1:
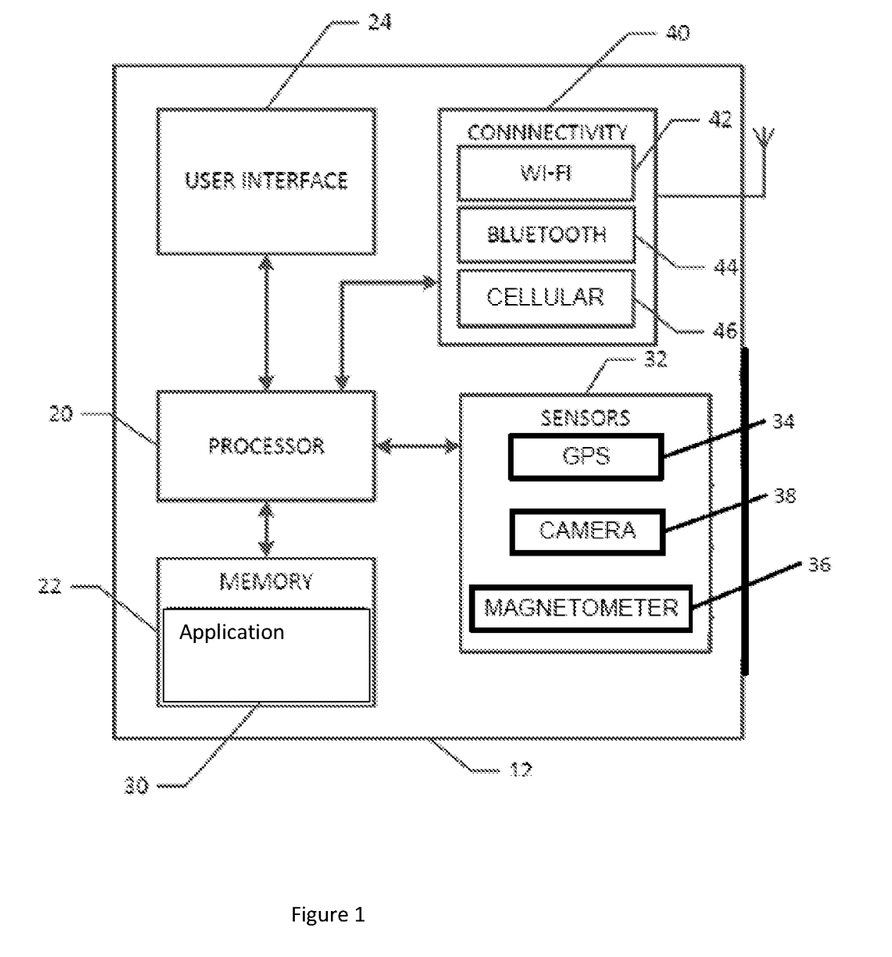
FIG. 1 is a block diagram of the mobile device according to various embodiments of the present invention.

Turning now to the figures, FIG. 1 is a block diagram of a mobile device 12 according to various embodiments. The mobile device 12 may be a smartphone, a tablet computer, a wearable computer (such as smart glasses or a smart watch), or any other suitable mobile computing device. FIG. 1 illustrates some of the components that in at least one example may be employed by or included as part of the mobile device 12. The mobile device 12 includes, for example, at least one processor 20, at least one memory unit 22, and a user interface 24. The memory 22 may include internal Random Access Memory (RAM), Read Only Memory (ROM) and/or flash memory, as well as optional removable storage. The RAM may be, for example, LPDDR2 DRAM; the ROM may include one or more memory chips; the flash memory may include a SSD or emmc flash memory; and the optional removable storage may include a form of microSD card. One or more of these memory units may store the mobile application 30, which is a software application that is executed by the processor 20, which causes the processor 20 to perform the functions and operations programmed by the mobile application 30. The user interface 24 may include a display (such as a LCD, LED, OLED display), a touch interface, and/or haptic systems that are common in today's mobile devices for allowing users to view and input information via the mobile device's display.

The mobile device 12 may also include various sensors 32 that are in communication with the processor 20, including a GPS receiver (or chip) 34 for calculating GPS coordinates (in an assisted GPS process, for example) and/or receiving GPS position coordinates for the mobile device 12. The mobile device 12 may also include a camera system 38 that captures digital images and/or video. The camera system 38 may comprise one or more cameras. The camera(s) of the camera system 38 may comprise, for example, CCD or CMOS sensors. The mobile device 12 may also include a magnetometer 36 and/or other inertial sensors, such as accelerometers and gyroscopes, to detect and quantify motion by the mobile device 12.

As shown in FIG. 1, the illustrated mobile device 12 also includes a wireless connectivity module 40, which may, for example, include any or all of a WiFi (IEEE 802.11) module 42, a Bluetooth module 44, a cellular network interface (e.g., 4G LTE or 5G) 46, and/or any other suitable wireless interface. The mobile device 12 connects to the internet, for example, wirelessly via one of these interfaces. In this manner, the mobile device 12 can connect to an application server (e.g., the application server 104 in FIG. 2) that hosts the mobile application 30. For the sake of simplicity, other conventional components of the mobile device 12 are not shown in FIG. 1, such as the power management system, the battery, level translators, the audio system, codecs, USB ports, etc.

Figure 2:
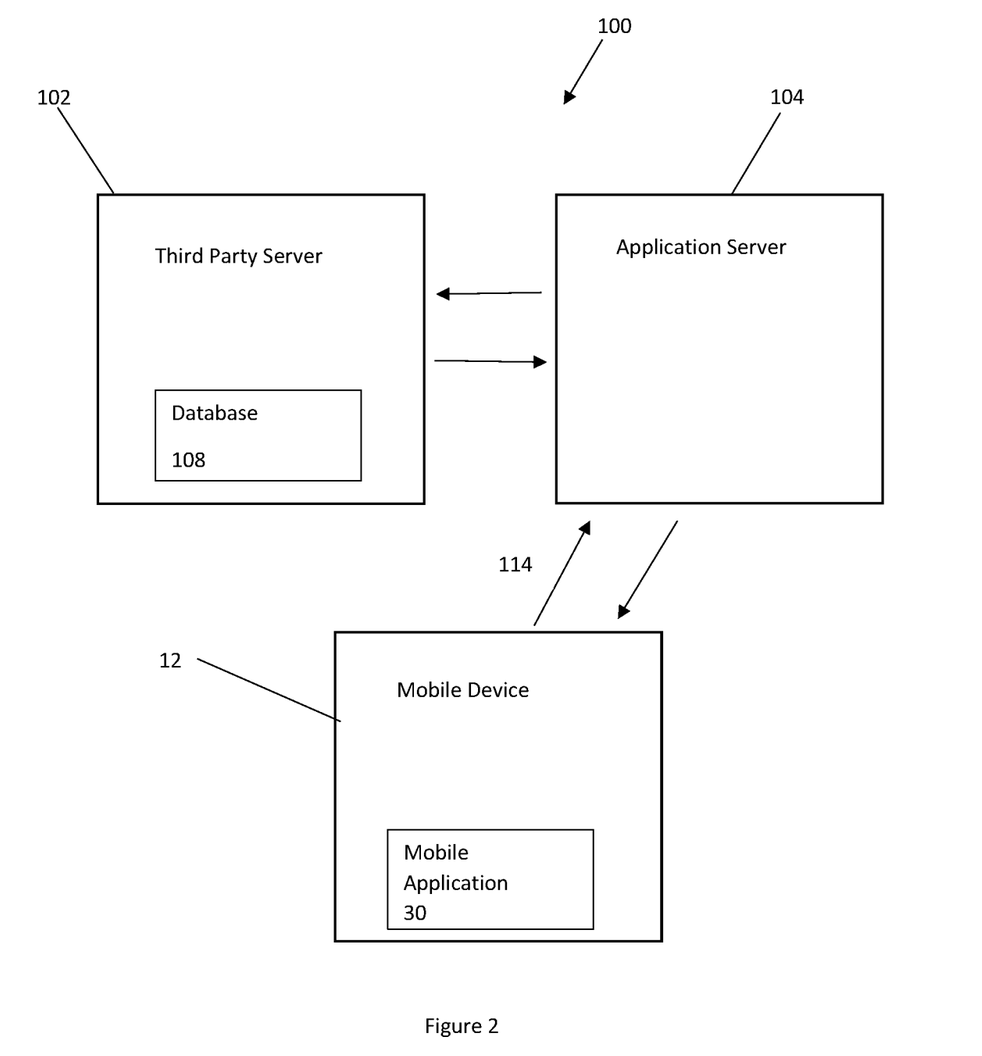
FIG. 2 is a system that comprises an application server, a mobile device, and a third party server, where the application server is for determining a risk rating for a log-in request from the mobile device based on information from the third party server, according to various embodiments of the present invention.

FIG. 2 is a system 100, according to various embodiments. The system 100 comprises an application server 104, the mobile device 12 with stored thereon the mobile application 30 hosted by the application server 104, and a third party server 102. The third party server 102 can house or include a database 108 that stores a status setting for the mobile device 12. In one aspect, the database 108 stores a status setting for each of a plurality of mobile devices that have the mobile application 30. For each mobile device 12 with the mobile application 30, the database 108 stores a device identifier and the status setting for that mobile device 12. In one embodiment, the third party server 102 is a server for a producer of the operating system of the mobile device. In one embodiment, the status setting comprises permanent device markings for of the third party server 102 for the mobile device 12. The permanent device markings can comprise, in various embodiments, exactly two bits, although in other embodiments the length of the permanent device markings could be different. The producer of the operating system of the mobile device typically controls the length of the permanent device markings.

In one aspect, the mobile application 30 is an application for performing and/or managing financial transactions and/or assets. For example, the mobile application 30 could be for managing accounts, buying or selling tangible or intangible objects, such as, for example, financial securities, NFTs, cryptocurrencies, etc. In the connection, the application server 104 may be hosted by, or associated with, a firm (such as a financial services firm) at which end-users (e.g., a user of the mobile device 12 with the app 30) has accounts with transactionable assets.

In one aspect, a user attempts to login to the mobile application 30 on the mobile device 12. In response, the mobile device 12 sends a log-in request to the application server 104. The application server 104 is configured to receive the log-in request 114 for the mobile application 30 service from the mobile device 12. The log-in request 114 includes device identifying information for the mobile device 12, such as a device ID for the mobile device, e.g., a unique, anonymized identifier made up of a combination of numbers and letters that is associated with a single mobile device. The application server 104 is to determine whether the user is able to login.

The application server 104 is configured to transmit, to the third party server 102, a request 116 for a status setting for the mobile application 30. In one aspect, the application server knows which third party server 102 to send the request to based on the operating system of the mobile device 12 and/or metadata about the mobile application 30 that is transmitted to the application server 104 by the mobile app 30 when a user opens the mobile app 30. For example, if the mobile device 12 has an iOS operating system and/or the mobile app 30 is designed to operate with an iOS system, metadata to that effect (e.g., the operating system of the mobile device 12) can be included in a request from the mobile app 30 to the application server 104. The application server 104 can use that metadata to know which third party server 102 to request the status setting for the mobile application 30.

The request 116 comprises the device identifying information for the mobile device 12. The third party server 102 is configured to retrieve the status setting from the database 108 based on the device identifying information for the mobile device 12. The third party server 102 stores information, e.g., a status setting, such as the permanent device markings, for a mobile device 12 by the device identifying information. The status setting can comprise a plurality of bits, such as exactly two bits. The third party server 102 is configured to send the status setting to the application server 104.

The application server 104 is configured to receive the status setting for the mobile application 30 from the third party server 102. The application server 104 determines a risk rating for the log-in request based in part on the status setting for the mobile application 30 from the third party server 102.

In one embodiment, the status setting comprises a first bit and a second bit corresponding to five states as follows. The first state is defined as the mobile device 12 has never been used before when no bits are returned. The second state is defined as the mobile device 12 has been seen by the mobile application 30 but it has never logged in when both bits are zero. The third state is defined as the mobile device 12 has logged in when the first bit is zero and the second bit is one. The fourth state is defined as the mobile device 12 is no longer being used by a client when the first bit is one and the second bit is zero. The fifth state is defined as the mobile device 12 has been used for fraud when both bits are one.

In one embodiment, the application server 104 is configured to determine whether the status setting for the application has changed from a previous non-active state to an active state. Upon determining that the status setting has changed from the previous non-active state to the active state, the application server 104 begins an authentication session for the mobile device 12. The application server 104 determines that the mobile application 30 has changed from a previous non-active state to an active state based on the login request. In one embodiment, the login request includes information corresponding to the previous state and the current state of the mobile application. In one embodiment, the non-active state is inactive state. In one aspect, the non-active state is background state.

For example, the mobile application 30 is in a non-active state when the mobile application 30 is closed. For example, the background state occurs when the mobile application 30 is not in the foreground but is running processes on the mobile device 12. For example, the active state occurs when the mobile application 30 is running in the foreground of the mobile device 12.

An authentication session begins when the mobile application 30 changes from the non-active state to the active state. The authentication session continues until the authentication session ends. In one embodiment, the application server 104 is configured to determine whether the mobile application 30 changes from a previous active state to a non-active state. Upon determining that the status setting has changed from the previous active state to the non-active state, the application server 104 is configured to end the authentication session. The application server 104 determines that the mobile application 30 has changed from a previous active state to a non-active state based on the login request. In one embodiment, the login request includes information corresponding to the previous state and the current state of the mobile application 30.

In one embodiment, the application server 104 is configured to gather or capture data during the authentication session. The data gathered can comprise, for example, at least one of a number of login attempts, a success status for each of the number of the login attempts, a time between two login attempts, a username used for each login attempt, a number of failed login attempts before a successful login attempt for a given username, and a number of different usernames used. In one embodiment, the status setting is further based on historic authentication sessions. The historic authentication sessions are stored on the application server 104.

For example, the application server 104 receives each login request and counts the number of login attempts. The application server 104 stores the number of login requests for a mobile application 30. The application server 104 determines the success status for each login attempt and records the success status for each login request. The application server 104 determines a successful login by determining the username and password match a required username and password. The application server 104 measures the time between two login attempts and records the time between the login attempts. The application server 104 comprises a timer that records the time between login attempts. The application server 104 stores the username used for each login attempt. For example, if the user executes a first login attempt with username "abcd" and a second login attempt with username "xyz," the application server stores the information. The application server 104 counts the number of different usernames used and stores the information. The application server 104 determines the number of failed login attempts before a successful login attempt for each username and records the number of failed login attempts with each username.

In one embodiment, for a successful login, the resulting risk rating can be weighted in conjunction with other traditional risk rating systems to determine the overall risk of the session. In one embodiment, for a failed login, the risk rating can be used to determine whether the incident should just be logged, or if further diagnostic or defensive action should be taken (e.g., blocking login or requiring further verification upon successful login). In one aspect, the risk rating is further based in part on the data gathered. In one embodiment, the risk rating weighs the status setting with the user's ability to login. In one embodiment, the risk rating is a numerical value.

For example, the risk rating is based on the status setting and the user's ability to login to the mobile application. For example, the risk rating is based on the status setting and the information gathered during the authentication setting. The risk rating weighs the status setting with the information gathered during the authentication session to determine the risk rating. For example the below table illustrates the risk ratings based on the status setting and the information gathered during the authentication session. In this rating system, a higher risk rating value indicates a higher perceived risk than a lower risk rating value. The "codename" corresponds to, for example, an informal, internal classification for the user based the login status and the status settings.

| Codename | Can Login? | Permanent Device Marking Bits | Conclusion | Proposed Risk Rating |
|---|---|---|---|---|
| Anonymous | Yes | — | New user or Returning user with new device | 3 |
|  | No |  | Possible attack (if multiple login attempts) | 5 |
| Loiterer | Yes | 00 | New user or Returning user with new device | 3 |
|  | No |  | Possible attack | 6 |
| Client | Yes | 01 | Low risk | 1 |
|  | No |  | Possible forgotten password | 2 |
| Discarded | Yes | 10 | Possible transfer to a new client (compare username) | 4 |
|  | No |  | Possible attack (if multiple attempts check user) | 5 |
| Fraudster | Yes | 11 | Possible fraud in progress | 7 |
|  | No |  | Possible attack | 6 |

For example, if the status setting does not comprise any information in the two bits and the user cannot login, the conclusion is a possible attack. If the status setting does not comprise any information in the two bits and the user can login, then the conclusion is a new user or a returning user with a device change.

For example, if the status setting comprises a zero in the first bit and the second bit and the user is unable to login, the conclusion is a possible attack. If the user is able to login, the conclusion is a new user or a returning user with a new device.

For example, if the status setting comprises a zero in the first bit and a one in the second bit and the user is unable to login, the conclusion is a possible forgotten password. If the user is able to login, the conclusion is a low risk login. The risk level varies based on the keys typed and the key count.

For example, if the status setting comprises a one in the first bit and a zero in the second bit and the user is unable to login, the conclusion is a possible attack. If there are multiple attempts, the application server is to take an action to check the user. If the user is able to login, the conclusion is a possible transfer to a new client. The action is to compare the usernames.

For example, if the status setting comprises a one in the first bit and a one in the second bit and the user is unable to login, the conclusion is a possible attack. If the user is able to login, then the conclusion is a possible fraud in progress.

For example, a new user conclusion is a risk rating of a three, whereas a possible attack is a risk rating of a 5. The larger the risk the higher the risk rating. The risk rating can further depend on the status setting, the ability to login, and the information gathered during the authentication session. For example, a possible attack risk rating is higher when numerous login attempts have been made with different usernames.

In one embodiment, the mobile application is to take an action based in part on the risk rating and the status setting. For example, the application server 104 takes the action of logging the data from the authentication session. The application server 104 also logs the risk rating from the authentication session. For example, the application server 104 takes the action of requiring from the mobile application 30, further verification. Further verification comprises requiring the user to provide a dual factor authentication, an answer to a question, or any other form of additional authentication.

For example, the application server 104 takes an action comprises blocking the log-in attempt. Blocking the log-in attempt comprises preventing the user from logging in to the mobile application 30. The application server 104 sends the mobile device 12 a denial of access to the mobile application 30.

For example, the application server 104 takes an action comprises deriving a conclusion based on the status setting and success of a login request. The conclusion is a determination of the possible scenario occurring, such as, a new user, a returning user with a new device, a possible attack, a low risk login attempt, a forgotten password, a possible transfer to a new client, or a possible fraud in progress.

In one embodiment, the action can comprise any combination of the above actions.

In one embodiment, the application server 104 is configured to update the status setting after a determination that the authentication session ended. In one embodiment, the application server 104 is configured to update the status setting based on the risk rating. The application server 104 is configured to update the status setting by storing the status setting on the third party server 102. The application server 104 sends the updated status setting to the third party server 102 with a request that the updated status setting be stored in the database 108. The request to update the status setting also includes the device identifying information so the third party server 102 can store the status setting with the corresponding device identifying information.

Figure 3:
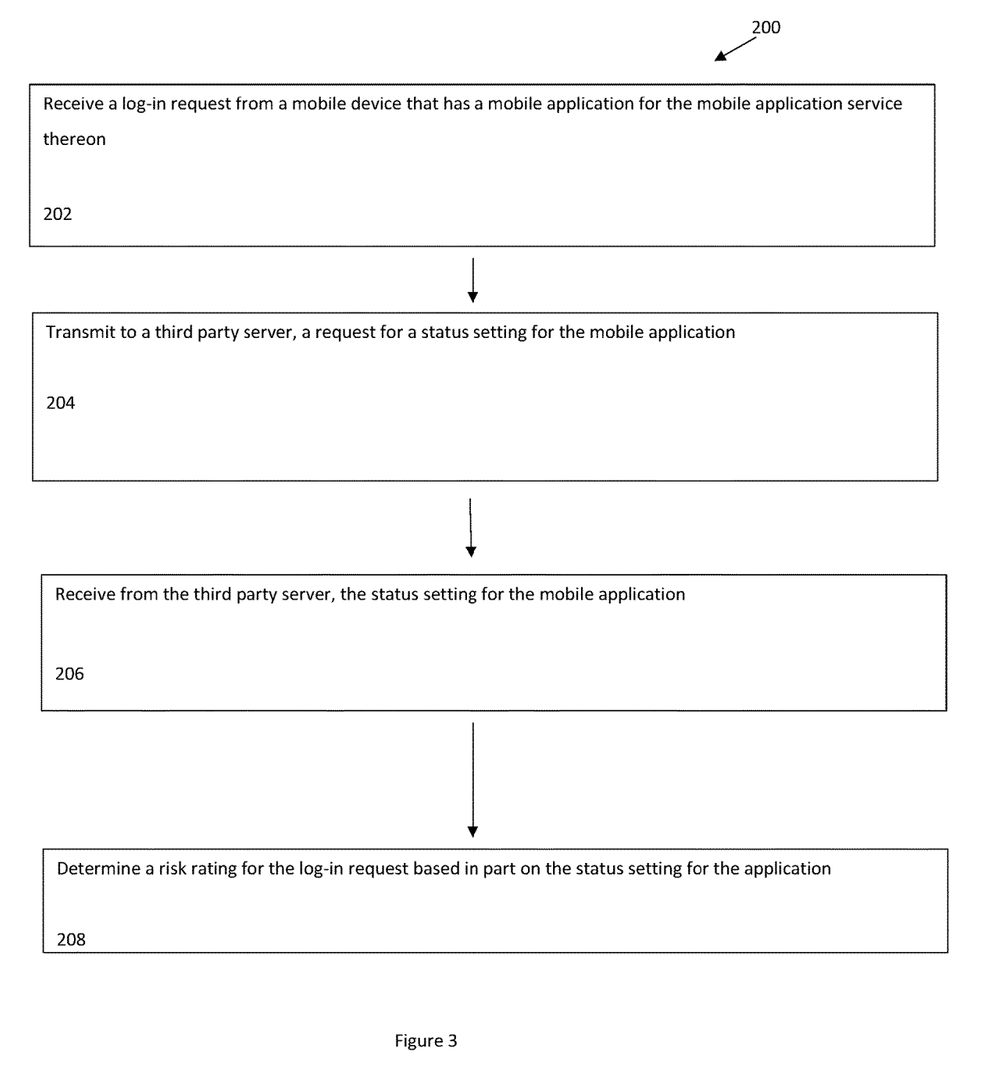
FIG. 3 is a flow chart of a process performed by the application server of FIG. 2 according to various embodiments of the present invention.

FIG. 3 is a flow chart 200 of operating the application server 104 according to various embodiments. The application server 104 receives 202 a log-in request from a mobile device that has a mobile application 30 for the mobile application service thereon. The log-in request includes device identifying information for the mobile device 12. The application server 104 transmits 204 to a third party server 102, a request for a status setting for the mobile application 30. The request comprises the device identifying information for the mobile device 12. In one embodiment, the status setting comprises permanent device markings for of the third party server 102 for the mobile device 12. The permanent device markings can comprise, in various embodiments, exactly two bits, although in other embodiments the length of the permanent device markings could be different. The third party server 102 retrieves the status setting from a database based on the device identifying information for the mobile device 12. The application server receives 206 from the third party server 102, the status setting for the mobile application 30. The application server 104 determines 208 a risk rating for the log-in request based in part on the status setting for the mobile application 30.

In one embodiment, the application server 104 determines based on the plurality of bits that the status setting for the mobile application 30 has changed from a previous non-active state to an active state. Upon determining that the status setting has changed from the previous non-active state to the active state, the application server 104 begins an authentication session for the mobile device 12.

In one embodiment, the application server 104 gathers data during the authentication session. The data comprises a number of login attempts, a success status for each of the number of the login attempts, a time between two login attempts, a username used for each login attempt; a number of failed login attempts before a successful login attempt for a given username, and a number of different usernames used.

In one embodiment, the application server 104 determines based on the plurality of bits that the mobile application 30 changes from a previous active state to a non-active state. Upon determining that the status setting has changed from the previous active state to the non-active state, the application server 104 ends the authentication session. The application server 104 determines that the mobile application 30 has changed from a previous active state to a non-active state based on the login request. In one embodiment, the login request includes information corresponding to the previous state and the current state of the mobile application 30.

In one embodiment, the application server 104 updates the status setting based on the risk rating. In one embodiment, the application server 104 updates the status setting after a determination that the authentication session ended. In one embodiment, the application server 104 updates the status setting by storing the status setting on the third party server. The application server 104 sends the updated status setting to the third party server 102 with a request that the updated status setting be stored in the database 108. The request to update the status setting also includes the device identifying information so the third party server 102 can store the status setting with the corresponding device identifying information.

In one embodiment, the application server 104 takes an action by logging the data from an authentication session. The application server 104 takes an action by requiring from the mobile application, further verification. The application server 104 takes an action by blocking the log-in attempt. The application server 104 takes an action by deriving a conclusion based on the status setting and success of a login request.

The application server 104 and the third party server 102 can be implemented with a single computer server or collection (e.g., cluster) of inter-networked servers. In that connection, the application server 104 and the third party server 102 may each comprise one or more processors and computer memory. The computer memory can include primary memory (e.g., memory directly accessible by the processor(s), such as RAM) and/or secondary memory (e.g., memory that is not directly accessible by the processors(s), such as ROM, flash, HDD, SSD, etc.). The computer memory(ies) can include, or store, software for the application server 104 and the third party server 102, as the case may be, and other computer functions described herein that may be implemented in computer software using any suitable computer programming language, such as .NET, C, C++, or Python, and using conventional, functional, or object-oriented techniques. For example, the application server 104 and/or the third party server 102 may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective systems described herein. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PUP, and Perl.

In one general aspect therefore, the present invention is directed to a system that comprises an application server for hosting a mobile application service; a mobile device having a mobile application for the mobile application service installed thereon; and a third party server. The application server is configured to receive a log-in request for the mobile application service from the mobile device, where the log-in request includes device identifying information for the mobile device. The application server is also configured to transmit, to the third party server, a request for a status setting for the mobile application, wherein the request comprises the device identifying information for the mobile device, where the status setting comprises a plurality of bits, and where the third party server retrieves the status setting from a database based on the device identifying information for the mobile device. The application server is also configured to receive from the third party server, the status setting for the mobile application. And the application server is also configured to determine a risk rating for the log-in request based in part on the status setting for the mobile application.

In another general aspect, the present invention is directed to a method that comprises the step of receiving, by an application server that hosts a mobile application service, a log-in request from a mobile device that has a mobile application for the mobile application service thereon, where the log-in request includes device identifying information for the mobile device. The method also includes the step of transmitting, by the application server, to a third party server, a request for a status setting for the mobile application, where the request comprises the device identifying information for the mobile device, and where the status setting comprises a plurality of bits, and where the third party server retrieves the status setting from a database based on the device identifying information for the mobile device. The method also comprises the step of receiving, by the application server, from the third party server, the status setting for the mobile application. And the method also comprises the step of determining, by the application server, a risk rating for the log-in request based in part on the status setting for the mobile application.

In various implementations, the status setting comprises exactly two bits. In that connection, the status setting can comprise a first bit and a second bit corresponding to five states defined as: (1) the mobile device has never been used before when no bits are returned; (2) the mobile device has been seen by the mobile application but it has never logged in when both bits are zero; (3) the mobile device has logged in when the first bit is zero and the second bit is one; (4) the mobile device is no longer being used by a client when the first bit is one and the second bit is zero; and (5) the mobile device has been used for fraud when both bits are one.

In various implementations, the third party server is a server for a producer an operating system of the mobile device.

In various implementations, the application server is configured to: determine whether the status setting for the mobile application has changed from a previous non-active state to an active state; and upon determining that the status setting has changed from the previous non-active state to the active state, begin an authentication session for the mobile device.

In various implementations, the application server is configured to gather data during the authentication session, where the data comprises: a number of login attempts; a success status for each of the number of the login attempts; a time between two login attempts; a username used for each login attempt; a number of failed login attempts before a successful login attempt for a given username; and/or a number of different usernames used. In various implementations, the risk rating is further based in part on the data gathered.

In various implementations, the application server is configured to: determine whether the mobile application changes from a previous active state to a non-active state; and upon determining that the status setting has changed from the previous active state to the non-active state, end the authentication session. In various implementations, the application server is configured to update the status setting after a determination that the authentication session ended. Updating the status setting can comprise storing, by the application server, the status setting on the third party server.

In various implementations, the application server is configured to update the status setting based on the risk rating.

In various implementations, the mobile application is configured to take an action based in part on the risk rating and the status setting. The action can comprise logging data, by the application server, from an authentication session; requiring, by the application server, from the mobile application, further verification; blocking, by the application server, the log-in attempt; and/or deriving, by the application server, a conclusion based on the status setting and success of a login request.

In various implementation, the status setting is further based on historic authentication sessions.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:
  an application server for hosting a mobile application service, wherein the application server comprises a first processor and a first memory;
  a mobile device comprising a second processor and s second memory, wherein the memory is configured to store a mobile application for the mobile application service installed thereon, wherein the processor is configured to execute the mobile application; and
  a third party server comprising a third processor and a third memory,
  wherein the first memory of the application server stores instructions executable on the first processor of the application server, wherein the instructions are configured to cause the application server to:
    receive a log-in request for the mobile application service from the mobile device, wherein the log-in request includes device identifying information for the mobile device;
    transmit, to the third party server, a request for a status setting for the mobile application, wherein the request comprises the device identifying information for the mobile device, and wherein the status setting comprises a plurality of bits, and wherein the third party server retrieves the status setting from a database based on the device identifying information for the mobile device;
    receive from the third party server, the status setting for the mobile application;
    determine a risk rating for the log-in request based in part on the status setting for the mobile application;
    determine whether the status setting for the mobile application has changed from a previous non-active state to an active state; and
    upon determining that the status setting has changed from the previous non-active state to the active state, begin an authentication session for the mobile device.

2. The system of claim 1, wherein the status setting comprises exactly two bits.

3. The system of claim 2, wherein the third party server is a server for a producer of an operating system of the mobile device.

4. The system of claim 1, wherein the application server is configured to gather data during the authentication session, wherein the data comprises:
  a number of login attempts;
  a success status for each of the number of the login attempts; a time between two login attempts;
  a username used for each login attempt;
  a number of failed login attempts before a successful login attempt for a given username;
  and a number of different usernames used.

5. The system of claim 1, wherein the application server is configured to:
  determine whether the mobile application changes from a previous active state to a non-active state; and
  upon determining that the status setting has changed from the previous active state to the non-active state, end the authentication session.

6. The system of claim 4, wherein the risk rating is further based in part on the data gathered.

7. The system of claim 1, wherein the application server is configured to update the status setting based on the risk rating.

8. The system of claim 5, wherein the application server is configured to update the status setting after a determination that the authentication session ended.

9. The system of claim 7, wherein updating the status setting comprises storing, by the application server, the status setting on the third party server.

10. The system of claim 1, wherein the application server is configured to take an action based in part on the risk rating and the status setting.

11. The system of claim 10, wherein the action comprises logging data, by the application server, from an authentication session.

12. The system of claim 10, wherein the action comprises requiring, by the application server, from the mobile application, further verification.

13. The system of claim 10, wherein the action comprises blocking, by the application server, the log-in attempt.

14. The system of claim 10, wherein the action comprises deriving, by the application server, a conclusion based on the status setting and success of a login request.

15. The system of claim 1, wherein the status setting comprises a first bit and a second bit corresponding to five states defined as:
  the mobile device has never been used before when no bits are returned;
  the mobile device has been seen by the mobile application but it has never logged in when both bits are zero;
  the mobile device has logged in when the first bit is zero and the second bit is one;
  the mobile device is no longer being used by a client when the first bit is one and the second bit is zero; and
  the mobile device has been used for fraud when both bits are one.

16. The system of claim 1, wherein the status setting is further based on historic authentication sessions.

17. A method comprising:
  receiving, by an application server that hosts a mobile application service, a log-in request from a mobile device that has a mobile application for the mobile application service thereon, wherein the log-in request includes device identifying information for the mobile device;
  transmitting, by the application server, to a third party server, a request for a status setting for the mobile application, wherein the request comprises the device identifying information for the mobile device, and wherein the status setting comprises a plurality of bits, and wherein the third party server retrieves the status setting from a database based on the device identifying information for the mobile device;
  receiving, by the application server, from the third party server, the status setting for the mobile application;
  determining, by the application server, a risk rating for the log-in request based in part on the status setting for the mobile application;
  determining, by the application server, based on the plurality of bits, whether the status setting for the mobile application has changed from a previous non-active state to an active state; and
  upon determining that the status setting has changed from the previous non-active state to the active state, beginning, by the application server, an authentication session for the mobile device.

18. The method of claim 17, wherein the status setting comprises exactly two bits.

19. The method of claim 18, wherein the third party server is a server for a producer of an operating system of the mobile device.

20. The method of claim 17, further comprising gathering, by the application server, data during the authentication session, wherein the data comprises:
- a number of login attempts;
- a success status for each of the number of the login attempts; a time between two login attempts;
- a username used for each login attempt;
- a number of failed login attempts before a successful login attempt for a given username;
- and a number of different usernames used.

21. The method of claim 17, further comprising;
determining, by the application server, based on the plurality of bits, that the mobile application changes from a previous active state to a non-active state; and
upon determining that the status setting has changed from the previous active state to the non-active state, ending, by the application server, the authentication session.

22. The method of claim 20, wherein the risk rating is further based in part on the data gathered.

23. The method of claim 17, further comprising updating, by the application server, the status setting based on the risk rating.

24. The method of claim 21, further comprising updating, by the application server, the status setting after a determination that the authentication session ended.

25. The method of claim 23, wherein updating the status setting comprises storing, by the application server, the status setting on the third party server.

26. The method of claim 17, further comprising taking an action, by the application server, based in part on the risk rating and the status setting.

27. The method of claim 26, wherein the action comprises at least one of: logging the data, by the application server, from an authentication session;
requiring, by the application server, from the mobile application, further verification; blocking, by the application server, the log-in attempt; or
deriving, by the application server, a conclusion based on the status setting and success of a login request.

28. The method of claim 17, wherein the status setting comprises a first bit and a second bit corresponding to five states defined as:
- the mobile device has never been used before when no bits are returned;
- the mobile device has been seen by the mobile application but it has never logged in when both bits are zero;
- the mobile device has logged in when the first bit is zero and the second bit is one;
- the mobile device is no longer being used by a client when the first bit is one and the second bit is zero; and
- the mobile device has been used for fraud when both bits are one.

29. A system comprising:
an application server for hosting a mobile application service, wherein the application server comprises a first processor and a first memory;
a mobile device comprising a second processor and s second memory, wherein the memory is configured to store a mobile application for the mobile application service installed thereon, wherein the processor is configured to execute the mobile application; and
a third party server comprising a third processor and a third memory,
wherein the first memory of the application server stores instructions executable on the first processor of the application server, wherein the instructions are configured to cause the application server to:
- receive a log-in request for the mobile application service from the mobile device, wherein the log-in request includes device identifying information for the mobile device;
- transmit, to the third party server, a request for a status setting for the mobile application, wherein the request comprises the device identifying information for the mobile device, and wherein the status setting comprises a plurality of bits, and wherein the third party server retrieves the status setting from a database based on the device identifying information for the mobile device;
- receive from the third party server, the status setting for the mobile application; and
- determine a risk rating for the log-in request based in part on the status setting for the mobile application; and wherein the status setting comprises a first bit and a second bit corresponding to five states defined as:
- the mobile device has never been used before when no bits are returned;
- the mobile device has been seen by the mobile application but it has never logged in when both bits are zero;
- the mobile device has logged in when the first bit is zero and the second bit is one;
- the mobile device is no longer being used by a client when the first bit is one and the second bit is zero; and
- the mobile device has been used for fraud when both bits are one.

30. A method comprising:
receiving, by an application server that hosts a mobile application service, a log-in request from a mobile device that has a mobile application for the mobile application service thereon, wherein the log-in request includes device identifying information for the mobile device;
transmitting, by the application server, to a third party server, a request for a status setting for the mobile application, wherein the request comprises the device identifying information for the mobile device, and wherein the status setting comprises a plurality of bits, and wherein the third party server retrieves the status setting from a database based on the device identifying information for the mobile device;
receiving, by the application server, from the third party server, the status setting for the mobile application; and
determining, by the application server, a risk rating for the log-in request based in part on the status setting for the mobile application; and
wherein the status setting comprises a first bit and a second bit corresponding to five states defined as:
the mobile device has never been used before when no bits are returned;
the mobile device has been seen by the mobile application but it has never logged in when both bits are zero;
the mobile device has logged in when the first bit is zero and the second bit is one;
the mobile device is no longer being used by a client when the first bit is one and the second bit is zero; and the mobile device has been used for fraud when both bits are one.

\* \* \* \* \*